March 7, 1967 J. R. SUSAG 3,307,656
HYDRAULIC SYSTEM FOR LIFT TRUCKS AND THE LIKE
Filed Oct. 22, 1965 3 Sheets-Sheet 1

INVENTOR
JEROME R. SUSAG
BY
ATTORNEY

March 7, 1967   J. R. SUSAG   3,307,656
HYDRAULIC SYSTEM FOR LIFT TRUCKS AND THE LIKE
Filed Oct. 22, 1965   3 Sheets-Sheet 2

INVENTOR
JEROME R. SUSAG
BY *J. E. Wiessler*
ATTORNEY

March 7, 1967 J. R. SUSAG 3,307,656
HYDRAULIC SYSTEM FOR LIFT TRUCKS AND THE LIKE
Filed Oct. 22, 1965 3 Sheets-Sheet 3

INVENTOR
JEROME R. SUSAG
BY
ATTORNEY

United States Patent Office 3,307,656
Patented Mar. 7, 1967

3,307,656
HYDRAULIC SYSTEM FOR LIFT TRUCKS
AND THE LIKE
Jerome R. Susag, Battle Creek, Mich., assignor to Clark
Equipment Company, a corporation of Michigan
Filed Oct. 22, 1965, Ser. No. 501,337
7 Claims. (Cl. 187—9)

This invention relates to hydraulic systems, and more particularly to safety mechanism for use with hydraulic elevator mechanism, such as in lift trucks.

Lift trucks have, over the years, proven to be an invaluable tool throughout industry in material handling operations of almost limitless variety. Although manufacturers of such equipment have more or less continuously stressed the importance of using qualified operators who are fully cognizant of the safety factors involved in the use of such vehicles, accidents have occurred from time to time. A common cause of such accidents is the failure of some drivers to operate the vehicle within its stability limitations.

A brief review of the more important factors which affect the stability of a lift truck is in order.

Essentially, over-all lift truck stability is divisible into longitudinal and lateral stability. Fixed factors which affect longitudinal stability are wheel base and weight distribution of the vehicle. Variable, and controllable, factors which affect longitudinal stability are the weight and distribution of weight on the forks, the elevation of the load on the forks, and the degree of forward or rearward tilt of the upright. If the truck is traveling up or down a slope, this will also affect longitudinal stability. Increasing the load, the distance of the center of gravity of the load from the front axle, the load elevation on the upright, the forward tilt of the upright, and/or the slope down which a truck travels will all effect, to a greater or lesser degree, a decrease in longtiudinal stability.

Fixed factors which affect lateral stability are the tread of the wheels and weight distribution of the vehicle. Variable, and controllable factors, which affect lateral stability are load elevation, load distribution on the forks, the degree and the direction of tilt of the upright, and/or the slope across which a truck may be traveling. As to the variable factors, back tilt of the upright, for example, will effect a decrease in the lateral stability of vehicles of a certain design while increasing the longitudinal stability, and forward tilt of the upright will have an opposite effect. Again, increasing the elevation of any given load on the upright with the upright in a vertical or non-tilted position, for example, will effect a decrease in both lateral and longitudinal stability.

Having given any set of values of the variable factors in a machine of a particular design, the resultant stability of a vehicle, both lateral and longitudinal, can be calculated. However, in the actual use of lift trucks, operators sometimes overload overlift, and/or overtilt a load, for instance, without considering the possible damage or injury to the vehicle or to the operator.

I have devised an extremely novel construction of great simplicity by means of which certain factors which affect longitudinal and lateral stability of lift trucks, and the like, are automatically controlled within acceptable limits of safety so that an operator cannot operate the truck in an unsafe manner in respect of various possible combinations of load, elevation and tilt.

It is an important object of the present invention to provide in hydraulic elevator mechanism pressure responsive means for limiting the load which can be lifted by the elevator as a function of the elevation of the load.

It is another important object of the invention to provide in hydraulic elevator mechanism which is tiltable forwardly and rearwardly of a vertical position, means for limiting the elevation to which a load can be raised as a function of the degree of tilt thereof from a vertical position.

Another object of the invention is to provide in a lift truck having a load lifting mast, means responsive to a hoist motor fluid pressure at one or more load elevations for limiting at various elevations the mass of the load carried by the mast.

Another object of the invention is to provide in a lift truck having a load lifting mast and hydraulic cylinder means for elevating loads on the mast, means responsive to cylinder pressure and load elevation to decrease maximum allowable load as a function of load elevation.

Other objects, features and advantages of the present invention will readily appear to persons skilled in the art from the following detailed description taken in conjunction with the drawings wherein.

Figure 1:
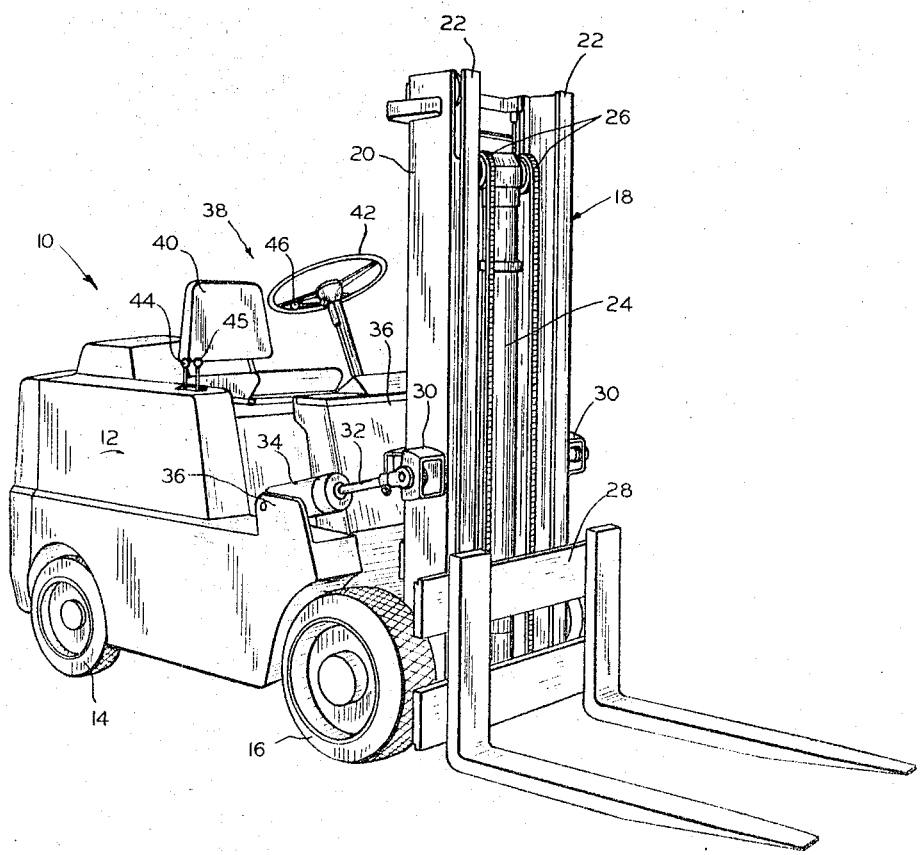
FIGURE 1 is a perspective view of an industrial lift truck with which the present invention is particularly well adapted to be used.

Referring now to the figures in detail, an industrial lift truck is shown generally in FIG. 1 at numeral 10. It comprises a body and frame structure 12 supported from a pair of rear steer wheels 14 and a pair of front drive wheels 16 having mounted for pivotal movement on the axle of wheels 16 an upright telescoping mast mechanism 18 having a pair of fixed outer upright channel members 20, a pair of inner telescoping roller mounted I-beam members 22 which are nested in channels 20 in overlapping relation, a vertical extending cylinder and piston hoist motor assembly 24 mounted in the base of the upright 18 and having chain and sprocket mechanism 26 associated therewith in a conventional manner and connected at one end to a fork carriage mechanism 28 which is adapted to be elevated in the upright by cylinder assembly 24. A detailed description of a suitable upright mechanism of the type generally described above appears in Patent No. 3,213,967. Connected to the outer side portion of each channel member 20 is a bracket 30 to which is pivotally connected the end of a piston rod 32 of a double-acting tilt cylinder assembly 34 which is pivotally connected at its base end to a bracket portion 36 of the truck frame. Cylinder assemblies 34 are adapted to actuate mast assembly 18 in a tilting movement fore and aft of a vertical position of the mast. A cowl and instrument panel 36 is mounted on the front end of the frame, rearwardly of which is located an operator's compartment 38 having a seat 40 mounted on the body portion, a steering wheel 42, and various controls 44, 45 and 46 for operating the truck and for controlling the operation of mast assembly 18 and cylinder assemblies 34.

Figure 2:
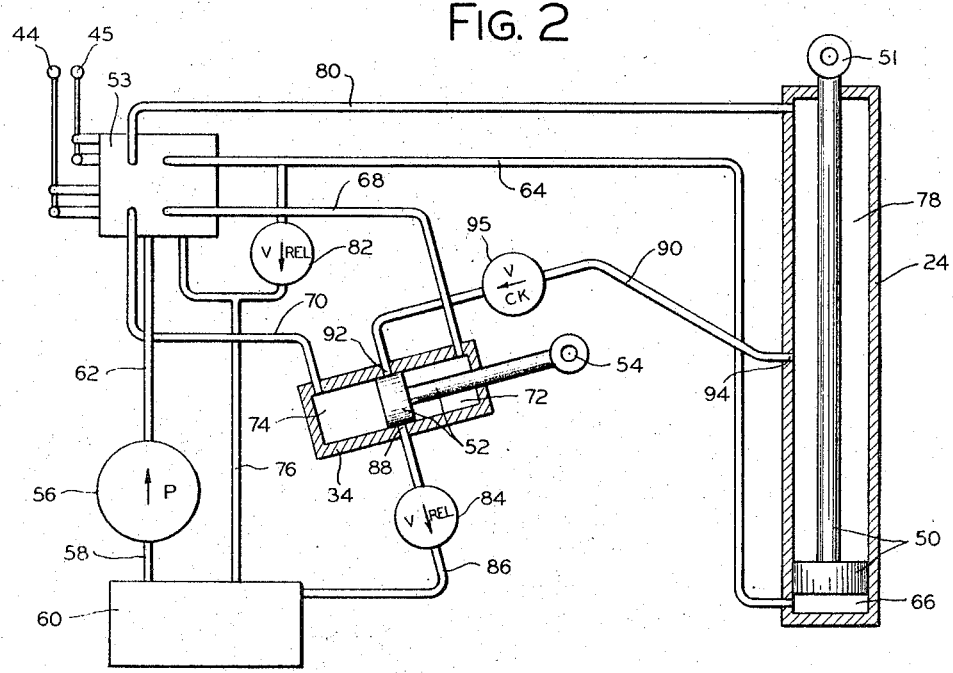
FIGURE 2 is a schematic view of a hydraulic circuit which illustrates the principles of my invention as applied in one embodiment thereof.

Referring now to FIG. 2, the hoist motor assembly 24 is illustrated schematically in conjunction with one illustration of a hydraulic system which embodies my invention. A double-acting piston and rod assembly 50 is mounted in cylinder assembly 24 and at its upper end 51 is adapted to be connected by means of the sprocket and chain mechanism 26 to carriage assembly 28, as aforesaid. It will be understood that extension of piston 50 upon the communication of pressure fluid to the lower end of the cylinder elevates by means of the chain and sprocket mechanism 26 the carriage assembly 28 in I-beams 22 and the I-beams in channels 20. Additional telescopic nested I-beam sections can be utilized in the mast assembly to produce a higher lift of the fork carriage 28, such as is disclosed in U.S. Patent No. 2,906,373, but in the interest of simplicity only a two-stage upright is represented herein. Control levers 44 and 45 are pivotally mounted on a valve housing 53 which contains a pair of double-acting spool valves, for example, to control the operation of piston 50 and of a double-acting piston and rod assembly 52 in each tilt cylinder assembly 34 which is operatively connected by means of a pivoted joint 54 to bracket 30, one on each side of upright assembly 18. A hydraulic pump 56 is connected by conduit 58 to a hydraulic fluid reservoir 60 for conducting pressure fluid, as selected by the operator, to both or either of cylinder assemblies 24 and 34 by way of a conduit 62 and the valves in housing 53 through conduits 64 or 80 to chambers 66 or 78, respectively, of cylinder 24, and/or through conduits 68 or 70 to chambers 72 or 74, respectively, of cylinder 34. A return line 76 connects non-pressurized ports of the valves in housing 53 to the reservoir 60. Actuation of control lever 45 in one direction pressurizes chamber 66 at, for example, 2,000 p.s.i. when the fork carriage 28 carries a capacity load for actuating the carriage with piston 50 to any desired elevation up to maximum elevation of the upright; when lever 45 is actuated in an opposite direction chamber 66 is vented through conduits 64 and 76 to reservoir 60 to permit lowering of the piston, fork carriage and any load carried thereby to floor level, as chamber 78 is pressurized by way of the pump, control valve, and conduits 62 and 80. Operation of valve lever 44 in one direction pressurizes chamber 74 to extend piston 52 for tilting upright 18 with fork carriage 28 in a forward direction, and actuation thereof in an opposite direction pressurizes chamber 72 for retracting piston 52 to actuate the upright and fork carriage to a rearwardly tilted position. When valve levers 44 and 45 are located in a centered position, as shown, the valves in valve housing 53 close all ports associated therewith for locking hydraulically pistons 50 and 52 in any selected position of extension or retraction within the respective cylinders.

A main relief valve 82 is connected to conduits 64 and 76 at a pressure setting slightly above the maximum pressure desired to operate piston 50, say 2010 p.s.i. in the example given, so that the maximum load to be elevated by fork carriage 28 cannot be substantially exceeded. Whenever the pressure in chamber 66 reaches the pressure setting of one-way valve 82, the valve opens to reduce the pressure by venting fluid from chamber 66 to reservoir 60 so that excessive loads cannot be elevated on the upright 18. A second one-way relief valve 84 is located in a conduit 86 which connects the valve 84 to reservoir 60 and to a port 88 preferably located centrally of cylinder 34. Another conduit 90 is preferably connected to a similarly centrally located port 92 in cylinder 34 and to a port 94 in lift cylinder 24, which latter port is located at a preselected height in cylinder 24. A check valve 95 is located in conduit 90 which permits flow of hydraulic fluid only in one direction, viz, from chamber 66 to port 92 when piston 50 is located above port 94. Relief valve 84 is adjusted to open, for example, at 1,000 p.s.i., the tilt cylinder piston 52 being designed to operate the mast assembly 18 to either a rearwardly or forwardly tilted position at a pressure in chambers 72 or 74, respectively, of, say, 900 p.s.i. It should be stated here that all pressure valves noted herein are merely exemplary of one possible combination of pressures utilized in the system, and in no way are intended to limit the invention.

As explained previously, one of the factors which affects both longitudinal and lateral stability of the truck is the amount that the upright is tilted either in a forward or rearward direction, particularly if the fork carriage is elevated to a substantial height while carrying a relatively heavy load. My invention as shown in FIG. 2, provides an automatic control of the weight which can be lifted and tilted either forwardly or rearwardly with the upright above a predetermined elevation. As will be apparent to persons skilled in the art, this is accomplished by the interconnection of the lift and tilt cylinders 24 and 34 by means of conduits 90 and 86 connected to the lift cylinder at port 94 which is located at a preselected height, and to tilt cylinder 34 at or near the center thereof so that with tilt cylinder piston 52 in a centered position, which represents a no-tilt position of the upright, ports 88 and 92 are covered by the piston head and there can be no flow of pressure fluid through port 94 to reservoir 60 by way of conduit 90, cylinder 34, conduit 86 and relief valve 84 so long as piston 52 remains in a centered position within the cylinder. Under such a no-tilt condition, lift piston 50 can be operated under heavy load up to maximum elevation of the fork carriage. However, if the upright is tilted either forwardly or rearwardly so that piston 52 uncovers ports 88 and 92, and the lift piston is elevated under a load which requires a pressure in chamber 66 greater than the pressure setting of relief valve 84, elevation above port 94 will effect a relief of pressure through relief valve 84 to reservoir 60 thereby prohibiting elevation and tilting of excessive loads above the elevation of port 94. This hydraulic safety device does not, of course, interfere with maximum elevation of loads below a predetermined weight and tilting of such loads either forwardly or rearwardly by piston 52 at maximum elevation. The thickness of piston 52 can be varied in design to provide any predetermined degree of tilt forwardly or rearwardly less than maximum tilt under predetermined load conditions on lift piston 50 since with, for example, a piston 52 having a greater thickness than that shown in FIG. 2, a degree of tilt of the upright would be permitted under maximum load limited only by the thickness of the piston head as related to the degree of tilt encountered when the ports 88 and 92 are uncovered by the piston head. If a relatively heavy load is elevated with piston 50 located above port 94 and tilt piston 52 is thereafter actuated to tilt the upright to an unsafe position in relation to the weight of load carried by the fork carriage at the assumed elevation, the higher pressure in chamber 66 required to lift the load will effect an opening of relief valve 84 as soon as the upright is tilted to a position in which ports 88 and 92 are uncovered, inasmuch as the pressure setting of valve 84 is substantially less than the pressure setting of valve 82 which, as noted above, is set to open at a preselected maximum pressure which is related to the capacity load to be lifted on the upright.

It may be found desirable in practice to utilize a regulator valve of the type which is disclosed in U.S. Patent No. 3,016,046, dated January 9, 1962, in either or both of conduits 68 and 70 as an additional safety device. It will be noted that if an operator has located a relatively heavy load at a high elevation on the upright, and then begins to tilt the upright, that the resulting surge of pressure in chambers 72 or 74 of the tilt cylinder during relief thereof through valve 84 would tend to accelerate the tilting movement so long as the operator held valve lever 44 in an actuated position. The operator himself, of course, could control this action by either closing the tilt control valve, or feathering it to control the rate of tilt. However, in order to minimize the possibility of an unsafe operating procedure a valve of the type disclosed in the above-mentioned patent may be found desirable. The prior patented valve is designed to control movement of a load inversely as a function of the load applied to a hydraulic piston, for example, so that as the load increases, as reflected in cylinder pressure, the velocity of movement of the piston associated therewith decreases. Use of this type of valve in conduit 68, for example, would prevent the operator from tilting the upright too rapidly forwardly upon opening of relief valve 84 in that as the pressure transmitted from chamber 66 to chamber 74 increases under heavy loads on the upright, a restriction in line 68 controlled by the prior patented valve increases, thus decreasing the forward speed of movement of piston 52 with an increase in pressure in chamber 74.

It will be obvious to persons skilled in the art that numerous variations in the circuitry are available within the scope of the concept of this invention. For example, additional controls related to the operation of tilt piston 52 can be readily effected so as to increase the flexibility of operation of the lift cylinder in such a system. It is apparent, for instance, that additional conduits can be connected to lift cylinder 24 at selected elevations above port 94 and to tilt cylinder 34 at selected positions to the right and to the left of ports 88 and 92 to control the amount of tilt of the upright permissible under various fork carriage loading conditions and at various elevations by simply actuating solenoid valves, for example, as a function of the longitudinal position of piston 52 in cylinder 34 to open the additional conduits connecting the lift and tilt cylinders as the upright is tilted to a greater degree in one direction. Thus, additional relief valves such as valve 84 adjusted to open at decreasing pressure values in such conduits connected to ports spaced successively forwardly of port 88, for example, would permit a successively decreasing load on the fork to be tilted an increasing number of degrees with the upright, all within safe stability conditions of the truck. This invention can be readily applied in a variety of practical designs which afford great flexibility of automatic control in the operation of such trucks in relation to the elevation of various loads and tilting thereof with the upright at any selected load elevations.

Figure 3:
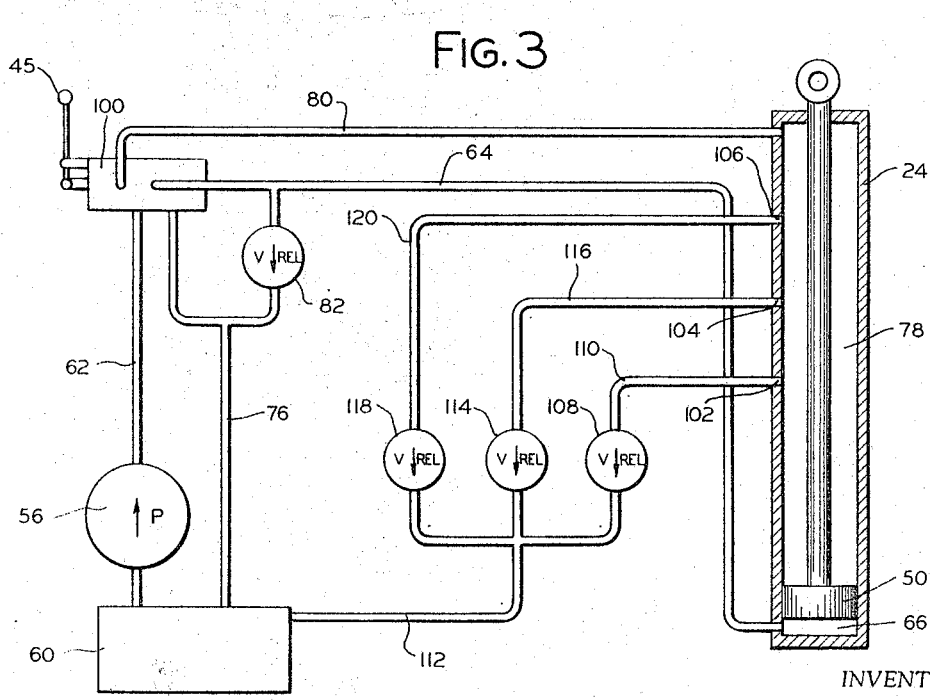
FIGURE 3 is a schematic view of a hydraulic circuit illustrating another embodiment of my invention.

Referring now to FIG. 3, another embodiment of the present invention is disclosed in which interconnection between the lift and tilt cylinders is not present, but the mass of the load to be lifted on the fork carriage is limited in a predetermined manner and as a function of elevation of the fork carriage. In FIG. 3 similar parts have been numbered the same as in FIG. 2. In this embodiment a valve body 100 is shown with which valve lever 45 is associated to operate lift piston 50 the same as in FIG. 2. At a plurality of predetermined elevations are located spaced ports 102, 104 and 106 in cylinder 24, each of which connects the cylinder to reservoir 60 by way of a conduit and a relief valve, the relief valves being adjusted to open at decreasing pressures as between the relief valve connected to least elevated port 102 and the valve connected to the most elevated port 106. A relief valve 108 connects port 102 to the reservoir by way of conduits 110 and 112, a relief valve 114 connects port 104 to the reservoir by way of conduits 116 and 112, and a relief valve 118 connects port 106 to the reservoir by way of conduits 120 and 112. If, as in FIG. 2, lifting of a rated or maximum desirable load is represented by a pressure of 2,000 p.s.i. in chamber 66, then relief valve 108 may be adjusted to open at a pressure of, say, 1200 p.s.i., relief valve 114 at 1000 p.s.i., and relief valve 118 at 800 p.s.i. It will thus be apparent that the mass of the load which can be elevated by the fork carriage in mast 18 is a function of the height to which the load is elevated, in accordance with recognized safe practices in the operation of lift trucks. Thus, it is not left to the discretion and skill of the operator to determine the proper combination of safe factors in operating the lift truck under various loads and elevations, since relief valves 108, 114 and 118 automatically limit the load which can be raised above preselected elevations, as determined by the locations of ports 102, 104 and 106 and the pressure settings of the relief valves.

It will be apparent that any combination of structure of the embodiments disclosed in FIGS. 2 and 3 are available and within the scope of this invention to limit various combinations of elevations and degrees of tilt of the upright under different load conditions on the fork carriage. This may be accomplished by simply combining in a selected manner the automatic control in FIG. 2, which operates as a function of a combination of degrees of tilt of the upright and elevation of a load above or below a predetermined mass, and the automatic control in FIG. 3 which limits the mass of loads which can be safely elevated above predetermined elevations.

Figure 4:
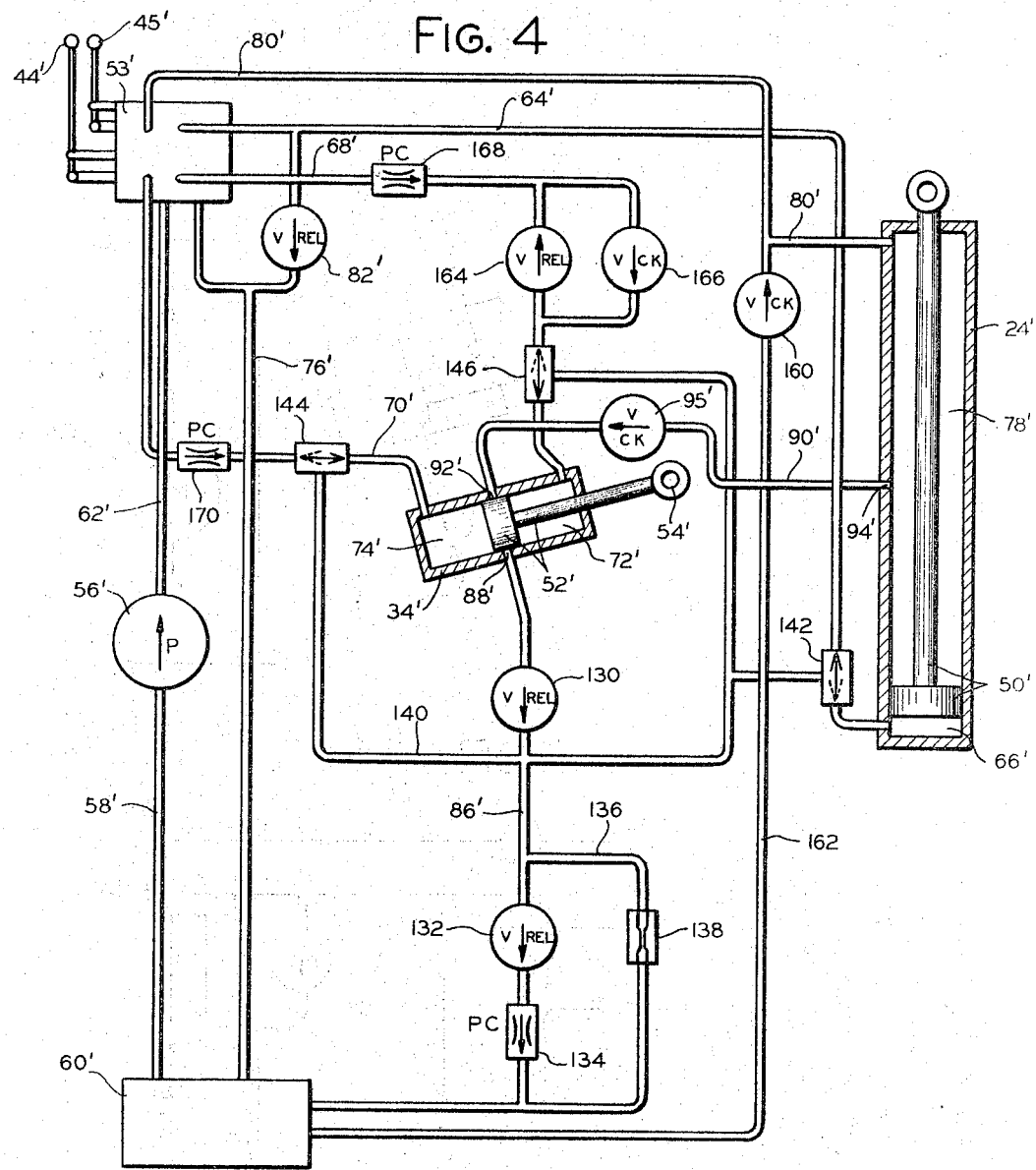
FIGURE 4 is a schematic view of a hydraulic circuit illustrating another embodiment of my invention.
Figure 5:
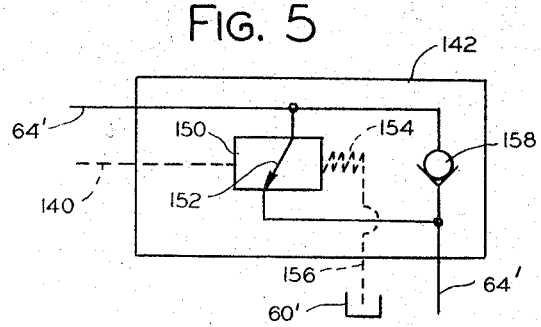
FIGURE 5 is a schematic view illustrating one of the types of valves embodied in the circuit of FIG. 4.

Referring now to FIGS. 4 and 5, there is illustrated a modified version of the hydraulic system as shown in FIG. 2, wherein similar parts have been identified by the same numerals as in FIG. 2 with a prime designation. The embodiment of FIG. 4 operates in accordance with the same basic principle as is exemplified in FIG. 2, but includes a number of refinements and safety features not present in FIG. 2.

Control valve housing 53' contains a pair of double-acting spool valves operated by a tilt control lever 44' and a lift control lever 45' to control the operation of each tilt cylinder assembly 34' and the lift cylinder assembly 24' in a manner similar to that disclosed in FIG. 2. Conduits 68' and 70' connect the tilt control valve to opposite ends of tilt cylinder 34', and conduits 64' and 80' connect the lift control valve to opposite ends of lift cylinder assembly 24'. Conduit 90' connects ports 92' and 94' in the tilt and lift cylinders, respectively, and conduit 86' connects tilt cylinder port 88' to fluid reservoir 60'. A main pressure relief valve 82' is connected to conduits 64' and 76' which limits maximum system pressure, which for the present purpose will be assumed to be 2000 p.s.i. When the pressure in chamber 66' reaches the pressure setting of valve 82', the valve opens to reduce the pressure by venting fluid from chamber 66' to reservoir 60' so that excessive loads cannot be elevated on the upright 18. The system as thus far described operates in a manner similar to the system as shown in FIG. 2.

It will be recalled that ports 88' and 92' in the tilt cylinder are blocked by piston 52' so long as the tilt of the upright is relatively small, and that fluid will be by-passed to reservoir 60' under certain conditions of tilt, load and elevation from cylinder chamber 66' through the tilt cylinder ports 92' and 88'. A first pressure relief valve 130 having an assumed setting of 950 p.s.i. and a second pressure relief valve 132 having an assumed setting of 50 p.s.i. are located in series flow relationship in conduit 86'. A third valve 134 is also located in conduit 86' downstream of and in series with relief valves 130 and 132. Valve 134 is a pressure compensated constant volume flow control valve of well-known type which operates to maintain a substantially constant volume flow therethrough regardless of variations in pressure differential across the valve. The symbol which represents this type of valve appears in an article entitled "Brush up on Your Circuit Symbols," Hydraulics and Pneumatics, June, 1965, page 73 (FIG. 6). The two relief valves 130 and 132 require, in accordance with the above example, a total pressure drop of at least 1000 p.s.i. in order to return hydraulic fluid to the reservoir from port 88'. In other words, when the tilt piston 52' is operated to uncover ports 92' and 88', and lift piston 50' is elevated above port 94', a load on the fork of the lift truck reflecting a pressure in chamber 66' of 1000 p.s.i. or greater will transmit said pressure to valve 130, effecting an opening of same at 950 p.s.i., and the remainder of said pressure to valve 132, opening at 50 p.s.i., thereby permitting hydraulic fluid to flow from the lift cylinder through the latter circuit to the reservoir through pressure compensated flow control valve 134. Until such time as port 94' is again covered by lift piston 50', the latter valve limits to a safe rate the speed at which the load is lowered on the fork of the lift truck, as determined by the constant volume of fluid which the valve 134 will pass. A bleeder circuit connects the reservoir to conduit 86' between valves 130 and 132, the latter circuit comprising a conduit 136 and a small fixed restriction 138 in said conduit. The purpose of the bleeder circuit is to bypass valves 132 and 134 in order to dissipate under certain conditions residual pressure in conduit 86' downstream of valve 130 for a purpose to be described. One-way check valve 95' is located in conduit 90' and performs the same function as valve 95 in FIG. 2, i.e., allows the free flow of fluid out of the lift cylinder but prevents flow into the lift cylinder through conduit 90'.

Connected to conduit 86' between valves 130 and 132 is a pilot pressure conduit 140 which is adapted to conduct pilot pressure fluid at 50 p.s.i. or greater to close, as may be required, normally open pilot operated check valves 142, located in conduit 64', 144, located in conduit 70', and 146, located in conduit 68'. The use of these three pilot operated check valves is the reason why the second relief valve 132 is used in conduit 86'; i.e., valve 132 provides that pressure which operates the pilot operated valves, and combines with valve 130 to provide the exemplary 1000 p.s.i. total pressure drop required in conduit 86' to bypass hydraulic fluid from lift cylinder chamber 66' to reservoir 60' in order to lower the load under conditions which require such operation for safety reasons. During normal operating conditions valves 142, 144 and 146 permit free flow of fluid therethrough in either direction, as required to operate the lift and tilt cylinder pistons. However, under any pressure condition in which relief valve 132 opens, pilot pressure is conducted to the three pilot valves by way of conduit 140 which closes the pilot operated portions of said valves, thus preventing the flow of pressure fluid into chamber 66' by way of conduit 64', or the flow of fluid out of chambers 72' or 74' by way of conduits 68' or 70', respectively. The solid line arrows represent the availability of free flow of fluid at all times in the directions indicated, whereas the dotted line arrows indicate that free flow through the respective valves in the directions indicated is possible only when minimum or greater pilot pressure is not present in conduit 140. Valve 142 is therefore actuatable by pilot pressure to prevent further lift, and valves 144 and 146 are likewise actuatable to prevent further tilt by preventing the exhaust of fluid from either end of the tilt cylinder.

FIG. 5 is a schematic representation of known pilot operated, normally open check valves of the type contemplated. As illustrated and numbered, it represents the operation of valve 142, wherein conduit 64' is connected to chamber 66' by way of a pilot operated valve portion 150 having a passageway 152 which connects portions of conduit 64' and provides free flow of pressure fluid into chamber 66' until such time as minimum pilot pressure is generated in conduit 140 which actuates valve portion 150 against spring 154 thereby interrupting communication between the portions of conduit 64' connected to the valve 150. A passageway 156 is adapted to vent any leakage fluid to reservoir 60'. A one-way check valve portion 158 provides at all times for free flow of pressure fluid from chamber 66' to reservoir 60' whenever lift valve lever 45' is actuated to lower the upright.

A one-way check valve 160 is provided in a conduit 162 which connects conduit 80' to reservoir 60'. Valve 160 prevents flow from chamber 78' to the reservoir by way of conduit 162. In the event piston 50' is elevated above port 94' under conditions of tilt and load which cause the system to operate automatically to lower the load, as explained above, valve 160 permits flow from the reservoir into chamber 78' in order to prevent the occurrence of a vacuum in said chamber, which would tend to suck dirt into the lift cylinder through the cylinder rod gland.

Conventionally in lift truck operation, no tilt cylinder pressure is required to tilt the upright forwardly with a load on the fork, since the load tends to cause the tilt cylinder to extend itself. To insure that pressure must be applied in order to extend the tilt cylinder, a relief valve 164 is provided in conduit 68' downstream of pilot valve 146. A check valve 166 opens in a direction opposite to the direction of opening of the relief valve 164 and is located in parallel with the relief valve. In addition, a pressure compensated constant volume flow control valve 168, similar to valve 134, is located in conduit 68' downstream of valves 164 and 166. "Downstream," as used here denotes the relationship of the various valves in conduit 68' during a condition of forward tilting movement of the upright when fluid flows from chamber 72' through the tilt valve section of valve assembly 53'. In other words, valve 168 limits the rate of tilting movement in a forward direction to a predetermined fixed rate. Another pressure compensated fixed volume flow control valve 170 is provided in conduit 70' and operates the same as valve 168 to control the rate of back tilting of the upright, which may be required under some conditions of operation in order to permit minimum pilot pressure of 50 p.s.i. to be generated. Relief valve 164 may be set to open at 800 p.s.i. in the example given, which in effect produces an artificial load in the tilt cylinder in a back tilting direction, thus requiring the application of pressure fluid in chamber 74' in order to actuate the mast in a forward direction, it being understood that normal pressure requirements to achieve back tilting with a normal load on the fork is also 800 p.s.i. in the example given. For back tilt operation, a relief valve such as valve 164 is, of course, unnecessary due to the fact that pressure in tilt cylinder chamber 72' is always required in order to tilt the mast rearwardly.

Let it be assumed that the load on the fork is such that 1010 p.s.i. is produced in the circuit originating at lift cylinder port 94', that the lift piston 50' is elevated above said port, and tilt piston 52' actuated forwardly to undercover ports 88' and 92'. Under such conditions, the pressure in conduit 86' is sufficient to open relief valves 130 and 132, simultaneously producing a pilot pressure of 60 p.s.i. which closes the normally open pilot valve portions of valves 142, 144 and 146, thus preventing any further lifting or tilting movement, and simultaneously lowering lift piston 50' at a controlled rate, as determined by pressure compensated valve 134, until port 94' is again covered by piston 50', thus lowering the load under the existing tilt condition to a safe elevation, whereupon valves 130 and 132 close, bleeder circuit 136 dissipates the pressure in conduit 86', and the three pilot operated valves open. A small orifice is used in restrictor 138 of the bleeder circuit for dissipating residual pilot pressure in conduit 86' following closure of valve 132. It should be understood that pilot pressure is operable between 50 p.s.i. and near maximum system pressure without damaging any system components, 50 p.s.i. being the normal minimum operating pressure of the pilot operated valves.

It will be noted that the system pressure may vary up to 2000 p.s.i. in the example given, at which point relief valve 82' opens. Therefore, the pressure across the entire circuit might vary in the above example during the time that relief valve 130 is open from 1010 p.s.i. to a maximum of about 2000 p.s.i. A corresponding variation in pilot pressure in conduit 140 will occur between a minimum of 60 p.s.i. and a maximum of 1050 p.s.i. while the corresponding variation in pressure drop across flow control valve 134 will vary between 10 p.s.i. and 1000 p.s.i., assuming zero spring rates in the various valves for purposes of this example. The pressure drop across the entire system during the time hydraulic fluid is flowing through flow control valve 134 will be proportional at all times to the load on the fork, which causes hydraulic fluid flow in the system to remain at a substantially constant low volume regardless of load, which is the primary function of valve 134. Flow control valve 168 operates in a similar manner in conjunction with relief valve 164 in the tilt control circuit to insure that flow in said circuit also remains at a substantially constant relatively low volume, regardless of load.

Although only a few embodiments of my invention have been described herein, this disclosure is merely for purposes of illustration and not as a limitation of the scope of the invention. It is therefore to be expressly understood that the invention is not limited to the specific embodiments shown, but may be used in various other ways, and that various modifications may be made to suit different requirements, and that other changes, substitutions, additions and omissions may be made in the construction, arrangement and manner of operation of the parts without necessarily departing from the scope of the invention as defined in the following claims.

I claim:

1. In a lift truck having an upright load lifting means adjacent one end thereof, hydraulic lift cylinder and piston means for elevating loads on the lifting means, hydraulic tilt cylinder and piston means for tilting the lifting means out of a vertical position and operator control means for directing pressure fluid to the lift and tilt cylinder means to elevate and tilt the lifting means, a conduit means interconnecting the lift and tilt cylinder means and communicating with lift cylinder means at a predetermined elevation and with the tilt cylinder means at a predetermined location longitudinal thereof, and relief valve means adapted to vent the lift cylinder means through said conduit means to a lower pressure under predetermined conditions of tilt of the load lifting means, elevation of the lift cylinder means and load carried by the load lifting means.

2. In a lift truck having an upright load lifting means adjacent one end thereof, hydraulic lift cylinder and piston means for elevating loads on the lifting means, hydraulic tilt cylinder and piston means for tilting the lifting means out of a vertical position and operator control means for directing pressure fluid to the lift and tilt cylinder means to elevate and tilt the lifting means, conduit means connecting the lift cylinder at a predetermined elevation to the tilt cylinder at a predetermined location, the tilt piston means being adapted to close the conduit means in said predetermined location, and the lift piston means being actuatable in extension below and above the conduit connection to the lift cylinder means, said lift piston means being extensible at a relatively high pressure by the operator control means to elevate relatively large loads on the load lifting means, said tilt piston means being actuatable at a relatively low pressure to tilt the lifting means, and valve means operable at an intermediate pressure to vent the lift cylinder means to a relatively low pressure when the lift piston means is located above the conduit connection to the lift cylinder means and the tilt piston means is located to uncover the connection of the conduit means to the tilt cylinder means.

3. In a lift truck having an upright load lifting means adacent one end thereof, hydraulic lift cylinder and piston means for elevating loads on the lifting means, hydraulic tilt cylinder and piston means for tilting the lifting means out of a vertical position and operator control means for directing pressure fluid through the lift and tilt cylinder means to elevate and tilt the lifting means, fluid pressure conducting means connecting the lift and tilt cylinder means at a predetermined location on each of said cylinder means, and valve means connected to said tilt cylinder means for venting said lift cylinder means and fluid pressure conducting means to a relatively low pressure when the lift piston means is disposed above the connection of the fluid pressure conducting means to the lift cylinder means and the tilt piston means is located in the tilt cylinder means to uncover the connection of the fluid pressure conducting means to the tilt cylinder means.

4. Hydraulic load lifting means having a hydraulic lift cylinder and piston means for elevating loads on the lifting means, hydraulic tilt cylinder and piston means for tilting the lifting means out of a vertical position and operator control means for directing pressure fluid to the lift and tilt cylinder means to elevate and tilt the lifting means, comprising fluid pressure generating pump means adapted to be fluid pressure connected selectively by the operator control means to either or both of said lift and tilt cylinder means whereby to extend the lift piston means for elevating loads on the lifting means and to extend and retract the tilt piston means from a central position in the tilt cylinder means for tilting the lifting means forwardly and rearwardly of a vertical position, a fluid reservoir, conduit means connected to said reservoir and to said lift and tilt cylinder means, said conduit means being connected to said lift cylinder means at a predetermined elevation and to said tilt cylinder means approximately centrally thereof, and relief valve means connected to said tilt cylinder means and to said reservoir.

5. Hydraulic elevator mechanism having an upright load lifting means, hydraulic lift cylinder and piston means for elevating loads on the lifting means, hydraulic tilt cylinder and piston means for tilting the lifting means out of a vertical position and operator control means for directing pressure fluid to the lift and tilt cylinder means to elevate and tilt the lifting means, comprising means operatively connected to the lift and tilt cylinder means for limiting the load elevated by the lift piston means above a predetermined elevation in a condition in which the tilt piston means is actuated to a location which tilts the lifting means a predetermined amount out from a vertical position.

6. Hydraulic elevator mechanism as claimed in claim 5 wherein said latter means includes pressure responsive valve means operable to vent the lift cylinder means to a lower pressure source when the tilt piston means is in said location and the lift piston means is extended above a predetermined elevation and supports a predetermined load.

7. Hydraulic elevator mechanism having an upright load lifting means, hydraulic lift cylinder and piston means for elevating loads on the lifting mechanism, hydraulic tilt cylinder and piston means for tilting the lifting means out of a vertical position and operator control means for directing pressure fluid to the lift and tilt cylinder means to elevate and tilt the lifting means, comprising means operatively connected to the lift and tilt cylinder means at predetermined locations for venting high pressure fluid in the lift cylinder means to a lower pressure at certain positions of the lift and tilt piston means relative to said predetermined locations and above a predetermined load on the load lifting means which is supported by the lift piston means.

References Cited by the Examiner

UNITED STATES PATENTS

| | | | |
|---|---|---|---|
| 2,659,505 | 11/1953 | Shaffer | 214—673 |
| 2,737,303 | 3/1956 | Held | 187—9 |
| 2,946,406 | 7/1960 | Henry | 187—9 |

EVON C. BLUNK, *Primary Examiner.*

H. C. HORNSBY, *Assistant Examiner.*